Figure 1:
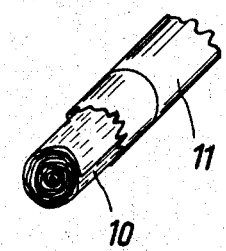

Sept. 19, 1967            H. WOLF           3,342,188

SMOKE FILTER, ESPECIALLY FOR TOBACCO PRODUCTS

Filed Dec. 9, 1964

Inventor:

Helmut Wolf 3,342,188
SMOKE FILTER, ESPECIALLY FOR
TOBACCO PRODUCTS
Helmut Wolf, Neuwied (Rhine), Germany, assignor to
Lohmann K.G., Fahr am Rhine, Germany
Filed Dec. 9, 1964, Ser. No. 417,245
Claims priority, application Germany, Dec. 10, 1963,
L 46,552
2 Claims. (Cl. 131—267)

This invention relates to and has for its object the provision of improvements in filters that are used in smokable items, especially cigarettes. Smoke filters should have easy drawing and ought to be effective in removing from tobacco smoke most of the ingredients which are harmful to the health of the smoker.

The first of these conditions is observed by maintaining the porosity of the filter body during the smoking process. The second of these conditions will be reached only if all the different factors affecting the health of the smoker are eliminated at the same time. These factors are the avoidance of the dust, especially from cutting the filter material into separated bodies and the elimination from products arising as well from the chemical reaction during the combustion of the tobacco particles as from the filter material itself. It is also to be regarded that the smoke within the filter body will not be dried out excessively causing adverse effect on the taste of the cigarettes, cigars, pipes and the like.

Up to now several proposals have been made to remove these disadvantages. Loose material from cotton or cellulose wad are known as well as cellulose made from wood which are made into fiber bodies or compacts for production of filter bodies. With these materials very often difficulties are encountered in that the fibers due to their high absorptive capacities close the filtering channels so that an undesirable high, and sometimes increasing degree of resistance to the drawing of smoke through the filter will be encountered.

In order to remove these difficulties the fibers have been solidified by binding agents in the assembly leaving free channels for the passage of the smoke. However, due to the high temperatures acting on the agents during the combustion process undesirable effects were observed which were inimical to the health of the smoker.

During the treating for the production of the known filter bodies other difficulties arose due to the fact that the material has a wad-like soft structure and could therefore not be treated in high-speed cigarette-machines without trouble. To avoid these disadvantages filter bodies were formed from threads arranged side by side into ropes which substantially consist of cellulose acetate. During the cutting into pieces of constant length, thus forming the filter bodies, dust is produced which will settle down in the channels of the filter body itself. During the smoking this cutting dust will be drawn out of the channel walls doing harm to the health of the smoker. This was slightly avoided by forming webs of paper which were substantially of fibrous character into filter bodies which were led through a shaping funnel in order to join them with preformed tobacco ropes. Paper materials are also known to be combined with wad-felts but this material has no constant porosity. The control of a constant porosity is even more difficult where webs of paper or other fibrous materials are provided with perforations or a pressed pattern resulting in irregular channels securing the filtering effect. This disadvantage is based on the fact that, during the treating in cigarette-machines, the perforations are arranged with respect to each other in an uncontrollable way.

Unexpected results were found by the present invention which differs from the above mentioned filters in that a tobacco smoke filter is employed comprising synthetic fibers of cellulose with or without addition of cotton fibers, said fibers having surfaces treated with a caustic solution and being thus stabilized to a high-porous fiber fleece and being neutralized and dried without any binding agent, said fleece being pleated or rolled thus forming a coherent filter body.

The fiber fleece of the unstabilized material may comprise some parts of cotton fibers while the main structure consists of regenerated cellulose fibers of predetermined staple length. The proportion of cotton fibers is chosen preferable at an amount of 20% of the total fiber mass. The surfaces and under special circumstances, the edges, also, of the stabilized fiber fleece may be roughened.

The roughening process of the solidified fiber fleece can be effected in mechanical or chemical ways, which methods are also suitable for the treatment of the fiber edges. This roughening process can be carried out on a known roughening machine, which has a large, rotating drum and a large number of scratching rollers with elastic wire hooks. These rollers rotate in the opposite direction to the rotation of the drum, to roughen the surface of the fleece between them.

Before pleating or rolling to form a laminate, several layers of the solidified fiber fleece may be superimposed and adjusted in accordance with the intended use. The stabilized fiber fleece may be at least partially metallized by the fibers being totally or at a predetermined degree coated with aluminum or other metals. The metallization may be carried out in some convenient manner by evaporation, cathodic disintegration or other known methods.

Further methods for varying the filter capacities with regard to their properties will result from the chosen type of fibers mainly on cellulosic origin, and perhaps the staple length. By this means an adaption to the kind of the tobacco will be also possible.

Figure 2:
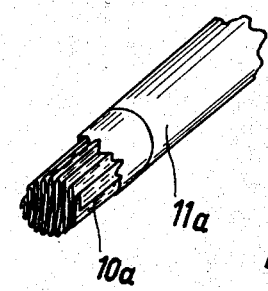

Illustrative of the invention are two embodiments in which:

FIG. 1 illustrates a cigarette with a rolled or coiled filter element with parts broken away, and FIG. 2 illustrates a modification in which the filter is pleated.

The superimposing of the fleeces can be carried out before the solidification by needling on needle-tables as in needling machines known in the art which align and intermingle the fibers. Then the treatment with caustic solutions follows as described above. By this treatment the alignment of the fibers forming the fleece will be attained even in its unstabilized state.

The filter bodies according to this invention may be produced from a fiber fleece which will be produced by passing a fleece of synthetic fibers on the base of regenerated cellulose through a lye bath having a concentration of 5 to 15% NaOH at a temperature of $-5$ to $+15°$ C. The treating time is 30 sec. to 1 min. The fleece coming from the lye bath is squeezed between rollers, neutralized by a washing or acidifying step and dried.

The filter bodies produced in accordance with the present invention have an unexpected high degree of porosity which remains constant during the whole treating process for carrying out the solidification without adhesive agents. The pores are irregularly disposed within the filter body, but nevertheless, the openings of the pores, being totally stabilized, are maintained open even during the mechanical manufacturing to filter bodies. The fibers are totally free of destructive agents and have no swelling capacities. Thus will be ensured that the filtering effect will remain constant during the whole smoking process. Dust from cutting, loose short fibers or the like are avoided as well as contaminations due to burning products which would derive from binding agents. Furthermore, by the metallization, at least partially carried out, a very tight contact between the metal film and the surface of the fibers will be reached.

The helical twisting of the treated material attained during the chemical treatment may be varied by the proportion of cotton which may be in the range of 3 to 20% of the total fiber mass whereby the porosity of the filter body will be also increased or decreased.

Examples of the present invention are shown in the drawings wherein FIGURE 1 shows a rolled filter body 10 on the end of a cigarette having the tubular sleeve 11, while FIGURE 2 shows a pleated filter body 10a on the end of a cigarette having the tubular sleeve 11a.

What I claim is:

1. A tobacco filter for smoking articles comprising a fleece laminate constituted of a plurality of individual fleece layers needle pinched together, the said laminate being formed into a cylinder, with the layers of said laminate extending axially of the cylinder, the fleece being constituted essentially of regenerated cellulose and the fibers of said fleece being treated with caustic, subsequently neutralized and dried in the absence of a binding agent, the said fibers being then metallized to produce a filter characterized by low liquid absorption and increasing cooling resulting in the high deposition of undesirable components from the smoke.

2. A tobacco filter as claimed in claim 1, in which said fleece is a homogenous mixture of said regenerated cellulose fibers and a smaller quantity of cotton fibers.

References Cited

UNITED STATES PATENTS

| 2,708,982 | 5/1955 | McGuff. | |
| 2,774,128 | 12/1956 | Secrist. | |
| 2,793,572 | 5/1957 | Parmele | 131—10 |
| 2,818,073 | 12/1957 | Taylor | 131—208 |
| 2,976,601 | 3/1961 | Powers. | |
| 3,180,911 | 4/1965 | Muller | 131—208 X |

FOREIGN PATENTS

| 1,885,864 | 1/1964 | Germany. |
| 849,551 | 9/1960 | Great Britain. |
| 908,185 | 10/1962 | Great Britain. |

OTHER REFERENCES

Borgwaldt: Germany DAS No. 1,061,246, published July 9, 1959.

Vavtier: Germany DAS No. 1,076,545, published Feb. 25, 1960.

Cigarette Components: Germany DAS No. 1,160,726, published Jan. 2, 1964.

SAMUEL KOREN, *Primary Examiner.*

MELVIN D. REIN, *Examiner.*